(12) United States Patent
Antoniucci et al.

(10) Patent No.: US 11,814,060 B2
(45) Date of Patent: Nov. 14, 2023

(54) METHOD FOR CONTROLLING AN OPERATING STATE OF A VEHICLE

(71) Applicant: PSA AUTOMOBILES SA, Poissy (FR)

(72) Inventors: Lionel Antoniucci, Nanterre (FR); Stephane Lanoue, Coulommes (FR)

(73) Assignee: PSA AUTOMOBILES SA, Poissy (FR)

( * ) Notice: Subject to any disclaimer, the term of this patent is extended or adjusted under 35 U.S.C. 154(b) by 239 days.

(21) Appl. No.: 17/311,208

(22) PCT Filed: Dec. 2, 2019

(86) PCT No.: PCT/FR2019/052880
§ 371 (c)(1),
(2) Date: Jun. 4, 2021

(87) PCT Pub. No.: WO2020/120871
PCT Pub. Date: Jun. 18, 2020

(65) Prior Publication Data
US 2022/0032937 A1 Feb. 3, 2022

(30) Foreign Application Priority Data
Dec. 12, 2018 (FR) ...................... 1872731

(51) Int. Cl.
*B60W 50/12* (2012.01)
*B60W 30/06* (2006.01)
(Continued)

(52) U.S. Cl.
CPC ............ *B60W 50/12* (2013.01); *B60W 30/06* (2013.01); *B60W 40/08* (2013.01); *B60W 50/10* (2013.01); *B60W 2040/0809* (2013.01)

(58) Field of Classification Search
CPC ...... B60W 50/12; B60W 50/08; B60W 50/10; B60W 40/08; B60W 2040/0809; G05D 2201/0213
See application file for complete search history.

(56) References Cited

U.S. PATENT DOCUMENTS

| 2004/0135670 A1 | 7/2004 | Guba |
| 2009/0064741 A1 | 3/2009 | Katairi |

(Continued)

FOREIGN PATENT DOCUMENTS

| DE | 102013202958 A1 | 8/2013 | |
| DE | 102014219502 A1 | 3/2016 | |
| WO | WO-2019026633 A1 * | 2/2019 | ............ B60W 30/06 |

OTHER PUBLICATIONS

WIPO translation of DE 102014219502 A1 (Year: 2014).*
(Continued)

*Primary Examiner* — Nicholas Kiswanto
*Assistant Examiner* — Christopher A Buksa
(74) *Attorney, Agent, or Firm* — Sandberg Phoenix & von Gontard, PC

(57) ABSTRACT

The method for controlling an operating state of a vehicle is such that the operating state, initially adopting a locked state which immobilizes the vehicle, can be modified in order to adopt any of the following unlocking states: a total unlocking state which allows activation of an operating mode of the vehicle, which is associated with the total unlocking state, without any restrictions; and partial unlocking states which each allow the activation of an operating mode associated with the partial unlocking state and which allow restricted activation of the vehicle. This control method comprises a step (E102) of activating one of the operating modes after modifying the operating state (E101) to authorize this activation.

14 Claims, 6 Drawing Sheets

(51) Int. Cl.
*B60W 40/08* (2012.01)
*B60W 50/10* (2012.01)

(56) References Cited

U.S. PATENT DOCUMENTS

2010/0071427 A1 3/2010 Tsuruta
2012/0209454 A1 8/2012 Miller et al.

OTHER PUBLICATIONS

WIPO Translation of WO-2019026633-A1 (Year: 2019).*
International Search Report for PCT/FR2019/052880 dated Apr. 15, 2020.
Written Opinion for PCT/FR2019/052880 dated Apr. 15, 2020.

* cited by examiner

METHOD FOR CONTROLLING AN OPERATING STATE OF A VEHICLE

CROSS-REFERENCE TO RELATED APPLICATIONS

This application is the US National Stage under 35 USC § 371 of International Application No. WO/2020/120871, filed 18 Jun. 2020 which claims priority to French Application No. 1872731 filed 12 Dec. 2018, both of which are incorporated herein by reference.

BACKGROUND

This invention relates to the unlocking of a vehicle, in particular a motor vehicle. In this regard, the invention relates to a method for controlling an operating state of a vehicle.

Conventionally, an immobilization device, also called an "immobilizer," for a motor vehicle comprises the means required for preventing the vehicle from starting when a hands-free vehicle identification device is not present in the passenger compartment of the vehicle.

During conventional operation of the immobilization device, such as a coded immobilizer, a random number is generated by a computer such as a control computer for a combustion engine. This random number is sent by a serial system bus (for example of the CAN type) to a built-in systems interface. If the hands-free identification device is authenticated by the built-in systems interface that received the random number, the interface responds to the combustion engine control computer by sending it an encrypted key that allows the immobilization device to be unlocked. As long as no identification device is authenticated by the built-in systems interface, the built-in systems interface does not respond to the combustion engine control computer, which, in this case, keeps the immobilizer in the locked state, which results in no instruction being sent to the ignition coils (gasoline engine) and/or no instruction being sent to the injectors (gasoline and diesel engines) by the computer engine control computer. This operation described for the combustion engine control computer can also be applied, where appropriate, to a control computer for a motor of a front electric machine of the vehicle, to a control computer for a motor of a rear electric machine of the vehicle if the motor vehicle comprises such equipment. Consequently, the locked state results in no current/voltage control for the motor concerned. This operation described for the combustion engine control computer and for the front and/or rear electric machine motor control computers applies to the control of the gearbox if the vehicle is equipped with an automatic hydraulic gearbox, for example having eight gears (in this case, a coded anti-gearshift means replaces the coded immobilizer). In this case, the locked state makes it impossible to leave the "park" position of the gearbox, thus blocking movement of the vehicle. It should be noted that, when the vehicle has a plurality of computers chosen from among a combustion engine control computer, a front machine motor control computer, a rear machine motor control computer and a gearbox control computer, it is sufficient for one of the vehicle computers to remain in the locked state in order for the entire vehicle power train to be inoperative. In addition, in the case of a vehicle having a combustion engine, as long as no identification device is authenticated by the built-in systems interface, it is impossible to control the starter in such a way that operation of the combustion engine is enabled. Such an operation requires the identification device to be present in the passenger compartment of the vehicle such that it can be authenticated by the built-in systems interface. This makes it possible to guarantee that a thief, who is not in possession of the vehicle identification device (for example the key), cannot activate the vehicle with a view to stealing it.

One drawback of the current operating principle of the immobilizer is that the immobilizer is incompatible with activation of the vehicle using a remote-control device.

DE102013202958 discloses a solution for restricting the operation of a vehicle in order to switch the vehicle from a fully operational mode for a main driver to a restricted mode for a secondary driver. Switching from this fully operational mode to the restricted mode can be done using a code. This solution is limited to a restricted mode.

SUMMARY

Disclosed is a method of activating an operating mode of a vehicle chosen from among a plurality of operating modes while ensuring the security of the vehicle in order to prevent it from being stolen.

This is achieved by controlling an operating state of a vehicle such that the operating state, initially in a locked state which immobilizes the vehicle, can be modified in order to adopt any of the following unlocking states:
  a total unlocking state which allows activation of an operating mode of the vehicle, which is associated with the total unlocking state, without any restrictions, and
  partial unlocking states which each allow the activation of an operating mode associated with the partial unlocking state and which allow restricted activation of the vehicle,
wherein the control method comprises:
  a step of receiving a control instruction requesting activation of one of the operating modes,
  a step of modifying the operating state so as to change it from the locked state to the unlocking state associated with the operating mode for which activation is requested in order to authorize activation of the operating mode, and
  a step of activating the authorized operating mode.

A control method of this kind makes it possible to add partial unlocking states that allow for activation of operating modes each associated with restricted activation of the vehicle. This makes it possible for not all functions of the vehicle to be activated in order to limit the possibilities of theft. By virtue of this, it is possible to remotely activate one of the operating modes associated with one of the partial unlocking states without having to monitor the vehicle.

The control method may also include one or more of the following features:
  the step of modifying the operating state comprises, after receipt of the control instruction: a step of transmitting an encrypted key identifying the operating mode for which activation is requested, the encrypted key being transmitted by a first computer of the vehicle to at least one second computer of the vehicle; a step of receiving the encrypted key by means of the second computer, resulting in the second computer switching from the locked state to the unlocking state associated with the operating mode for which activation is requested in order to authorize the second computer to provide at least one service that assists with implementation of the operating mode identified by the encrypted key received;

the control method comprises a step of verifying a condition relating to the request for activating one of the operating modes, verification of the condition causing the modification step to be implemented;

one of the operating modes associated with one of the partial unlocking states provides, when this operating mode is activated, an autonomous parking function of the vehicle such that the restricted activation of the vehicle allows movement of the vehicle while preventing the vehicle from exceeding a speed threshold;

one of the operating modes associated with one of the partial unlocking states provides, when this operating mode is activated, a thermal preconditioning function of the vehicle such that the restricted activation of the vehicle allows the thermal preconditioning function to be implemented provided that the speed of movement of the vehicle is zero;

the control method comprises a step of transmitting the control instruction by means of a remote-control device, the control instruction requesting activation of one of the operating modes associated with one of the partial unlocking states;

the control method comprises a step of transmitting the control instruction such that the control instruction transmitted requests activation of the operating mode associated with the total unlocking state, and the step of modifying the operating state changes the operating state from the locked state to the total unlocking state only if an identification device is present in the passenger compartment of the vehicle;

each instance of restricted activation of the vehicle involves activating all or part of a power train of the vehicle intended to set the vehicle in motion while limiting the operation of the power train.

Also disclosed is an immobilization device for a vehicle, the immobilization device comprising means for carrying out the steps of the control method as described.

Also disclosed is a vehicle comprising an immobilization device as described.

Other advantages and features will become clear from the description that follows.

BRIEF DESCRIPTION OF THE FIGURES

The invention will be better understood upon reading the description that follows, given solely by way of non-limiting example and with reference to the appended figures listed below.

In the figures, the same references are used to designate the same elements.

DETAILED DESCRIPTION

Figure 1:
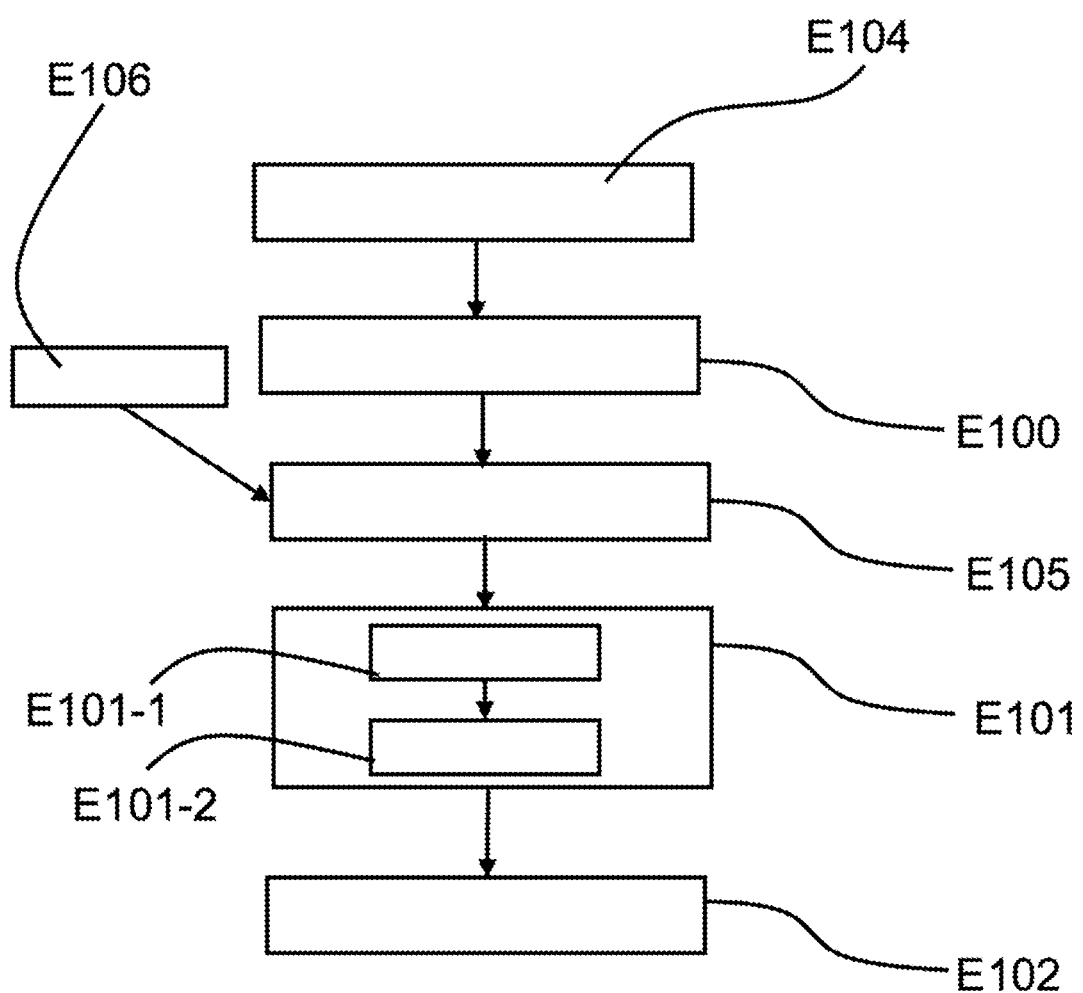
FIG. 1 is a flowchart showing steps of a method for controlling an operating state of a vehicle.

In the present description the noted abbreviations will have the following meanings:

"CKI" will be used to designate a coded key immobilizer,

"BSI" will be used to designate a built-in systems interface,

"MEC" will be used to designate a multifunctional engine computer such as a combustion engine control computer or an engine control computer, "CAN" will be used to designate a serial system bus or "controller area network,"

"MCUx" will be used to designate a control computer or "machine control unit" for a motor of the electric machine at the front if x is 1 or at the rear if x is 2, "TCU" will be used to designate a gearbox control computer or "traction control unit," and "HFI" will be used to designate a hands-free identification device.

In the present description, the vehicle 100 is in particular a motor vehicle.

A method for controlling an operating state of a vehicle 100 is illustrated, for example in FIGS. 1 to 4. The operating state is chosen from a locked state E0 which immobilizes the vehicle 100 and the unlocking states E1, E2, E3. More specifically, the control method is such that the operating state, initially adopting the locked state E0 which immobilizes the vehicle 100, can be modified in order to adopt any of the unlocking states E1, E2, E3, depending on a control instruction received as described below. The unlocking states E1, E2, E3 are as follows, E1 is a total unlocking state, also referred to as the first unlocking state, which allows activation of an operating mode of the vehicle 100 without any restrictions, this operating mode being associated with the total unlocking state E1. E2 and E3 are partial unlocking states, also referred to as second states, which each allow the activation of an operating mode associated with the partial unlocking state and which allow restricted activation of the vehicle 100 in order to provide a function associated with the operating mode. While the operating state is the locked state E0, the control method comprises a step E100 of receiving a control instruction requesting activation of one of the operating modes (the operating modes being those respectively associated with the unlocking states E1, E2, E3), and a step E101 of modifying the operating state so as to change it from the locked state E0 to the unlocking state E1, E2, E3 associated with the operating mode for which activation is requested in order to authorize activation of the operating mode for which activation is requested. Of course, after the modification step E101, the control method may include a step E102 of activating the authorized operating mode, that is to say the mode for which activation was requested by the control instruction and of which implementation is then authorized by the operating state of the vehicle 100, which is then in the unlocking state E1, E2, E3 associated with this authorized operating mode.

As such, the present method makes it possible to provide so-called "partial" unlocking states, each allowing operation of the vehicle 100 to be restricted, in addition to the conventional locked and total unlocking states. Such restrictions make it possible, in particular, to limit the risk of theft of the vehicle 100 when the engine 102 (FIGS. 2 and 3) thereof intended for assisting with the movement of the vehicle 100 is started after partial unlocking, for example in order to perform a particular function of the corresponding mode of operation while an HFI 103 of the vehicle 100 (a key, in particular a wireless key, allowing the vehicle to be started without any restrictions) is not in the vehicle 100.

Figure 5:
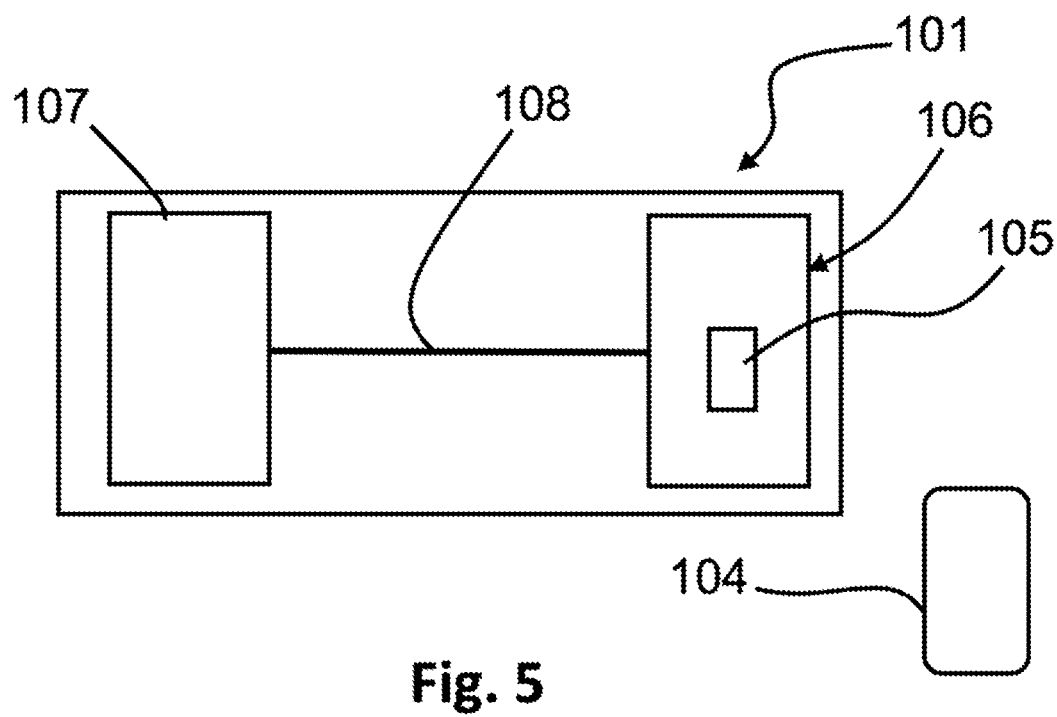
FIG. 5 shows the immobilization device associated with the remote-control device.

Consequently an immobilization device 101 for a vehicle 100, in particular a motor vehicle is also disclosed. The immobilization device 101 comprises means for executing the steps of the control method as described herein. Such means may be program code instructions for execution of the control method by means of a computing device that may comprise a plurality of computers as described below. For example, the immobilization device 101 is a CKI. A particular embodiment of the means for carrying out the method will be described in more detail below with reference to FIG. 5. In particular, the immobilization device is configured to receive the control instruction, modify the operating state, and activate the authorized operating mode. The advantages associated with the control method also apply to the immobilization device 101.

The immobilization device 101 comprises/is put in the operating state, which can vary from the locked state E0 to any one of the unlocking states E1, E2, E3. In other words, the immobilization device 101 can comprise a list of states comprising the locked state E0 and the unlocking states E1, E2, E3, and the operating state can adopt each of the states of this list of states. It follows from what has been described above that each unlocking state E1, E2, E3 is associated with an operating mode of the vehicle 100 such that, when the operating state is in the total unlocking state E1, the operating mode associated with the total unlocking state E1 allows the vehicle 100 to be used without any restrictions, and such that, for each partial unlocking state E2, E3, the operating mode associated with the partial unlocking state E2, E3 allows restricted activation of the vehicle 100 in order to perform the function associated with the operating mode, in particular when the operating state is in this partial unlocking state.

The term "restricted activation of the vehicle" should be understood to mean that the vehicle 100 is not fully functional in the sense that its operation is limited. For example, the restricted activation of the vehicle 100 involves starting the engine 102 of the vehicle 100, the engine being a front or rear engine 102 intended to assist with movement of the vehicle and is, for example, part of the power train of the vehicle 100 but in this case prevents or limits the movement of the vehicle 100. The power train may also include the gearbox of the vehicle 100. Therefore, the immobilization device 101 and the corresponding control method make it possible to limit the risks of theft of the vehicle 100. In other words, each instance of restricted activation of the vehicle 100 may involve activating all or part of the power train of the vehicle 100 intended to set the vehicle 100 in motion while limiting the operation of this power train.

Consequently, the operating modes are in particular all different, as are, where appropriate for the operating modes associated with the partial unlocking states, the instances of restricted activation which they allow. When an operating mode is activated, activation of the corresponding vehicle 100, whether unrestricted or restricted, is authorized/implemented.

In particular, each operating mode is associated with a "situation of the vehicle" that defines a particular condition which, when it is verified, allows the operating mode to be implemented.

Figure 6:
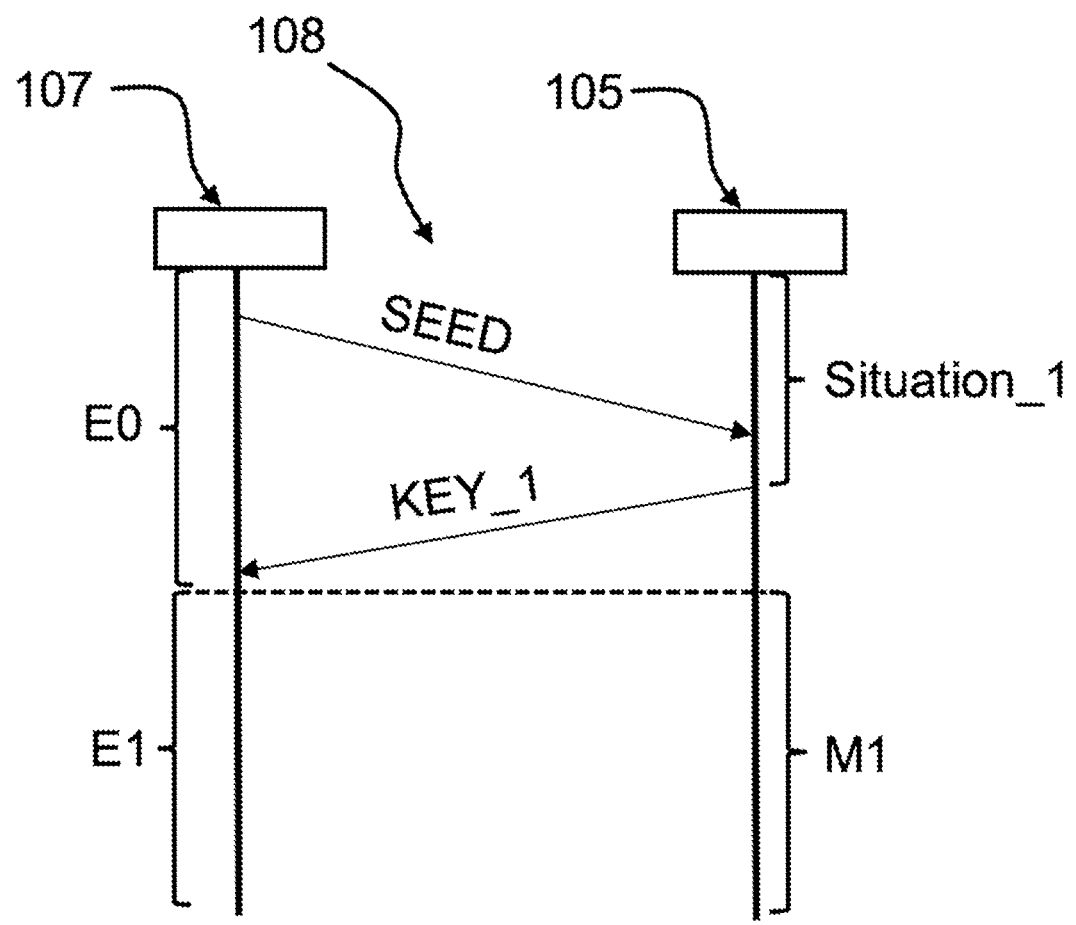
FIG. 6 shows the exchanges between two computers for fully unlocking the vehicle.

For example, a first operating mode M1 (FIG. 6), associated with the total unlocking state E1, is in particular implemented when the verified condition is an authentication of the HFI 103 (FIG. 2) of the vehicle 100 present in the passenger compartment of the vehicle 100 and when the control instruction is a request for the driver to activate start-up of the vehicle 100. According to this first operating mode M1, the situation corresponds to the presence of the HFI 103 in the passenger compartment associated with the start request. In this case, unrestricted driving of the vehicle 100 is deemed authorized. Therefore, the control instruction received (step E100) can request activation of this first operating mode M1 and step E102 then activates this first operating mode M1.

Figure 7:
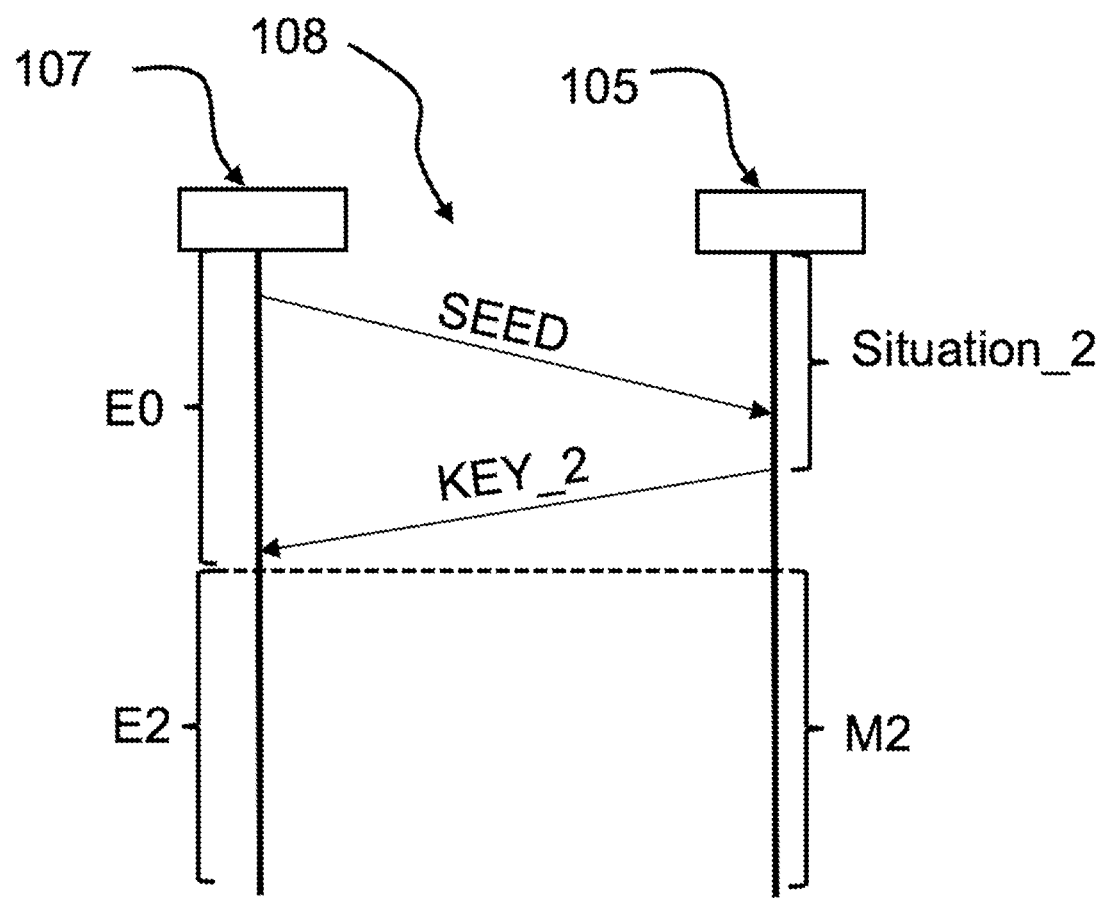
FIG. 7 shows the exchanges between two computers for partially unlocking the vehicle when the situation is as follows: activation of a connected "thermal preconditioning" service by the remote-control device.

For example, a second operating mode M2 (FIG. 7), associated with one of the partial unlocking states E2, is only implemented if the verified condition corresponds to a request to activate a thermal preconditioning function of the vehicle 100. In this case, the aim is to heat the vehicle 100, for example by starting its engine 102 while preventing movement of the vehicle 100. When this second operating mode is activated (in particular by step 102), this second operating mode M2 provides the thermal preconditioning function of the vehicle 100 such that restricted activation of the vehicle 100 (that permitted by this second operating mode and therefore by the partial unlocking state E2) allows implementation of this thermal preconditioning function provided that the speed of movement of the vehicle 100 is zero. In this example, the restricted activation can allow the motor 102 to stop if the vehicle 100 starts to move (non-zero speed), thus preventing theft thereof in the event of a thief entering the passenger compartment during this second mode of operation. Therefore, the control instruction received (step E100) can request activation of this second operating mode M2 and step E102 then activates this second operating mode M2.

Figure 8:
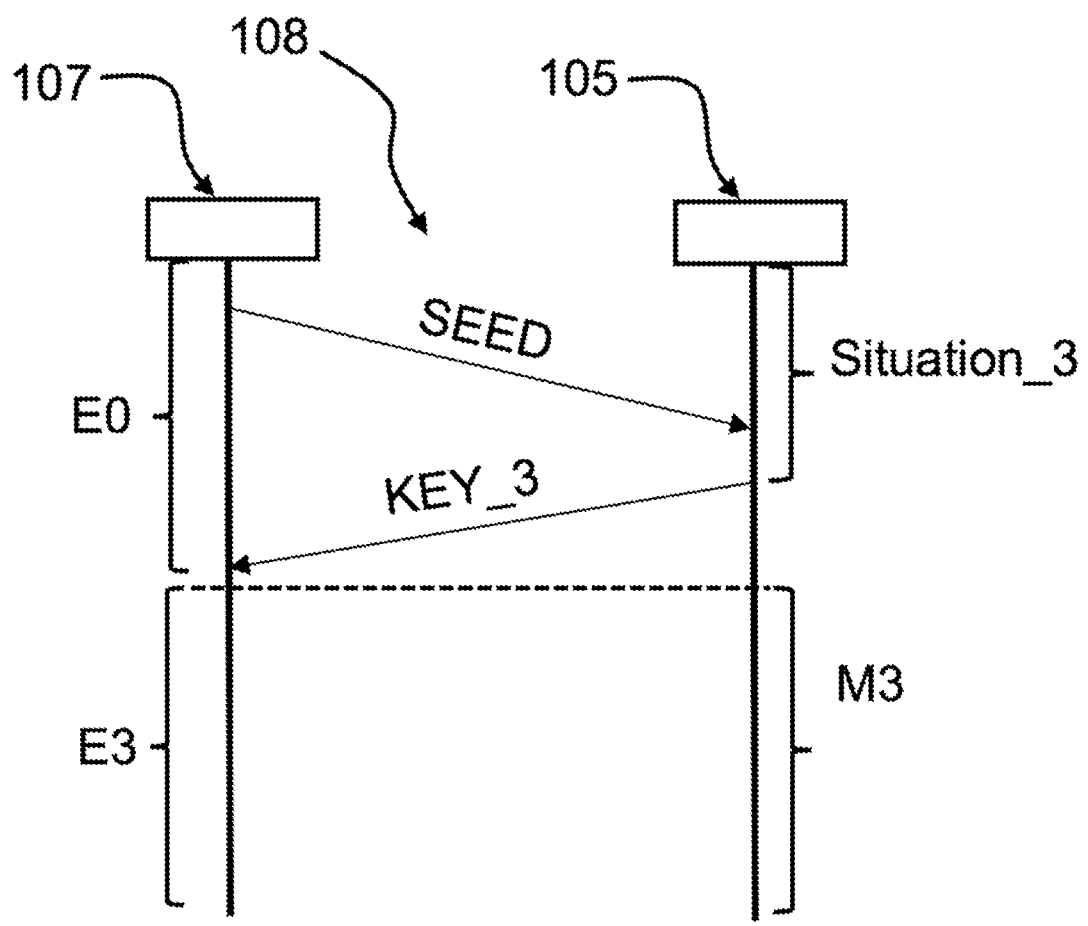
FIG. 8 shows the exchanges between two computers for partially unlocking the vehicle when the situation is as follows: activation of a connected "autonomous parking" service by the remote-control device.

For example, a third operating mode M3 (FIG. 8), associated with one of the partial unlocking states E3, is only implemented if the verified condition corresponds to a request to activate an autonomous parking function of the vehicle 100 and the associated restriction can prevent the vehicle 100 from exceeding a speed threshold of, for example, 30 km/h. When this third operating mode is activated (in particular by step 102), this third operating mode provides an autonomous parking function of the vehicle 100 such that restricted activation of the vehicle 100 (that permitted by this third mode of operation and therefore by the partial unlocking state E3) allows movement of the vehicle 100 while preventing the vehicle 100 from crossing the speed threshold. This makes it possible, in the event of a thief entering the passenger compartment, to prevent the thief from fleeing at full speed with the vehicle 100. Therefore, the control instruction received (step E100) can request activation of this third operating mode M3 and step E102 then activates this third operating mode M3.

Figure 2:
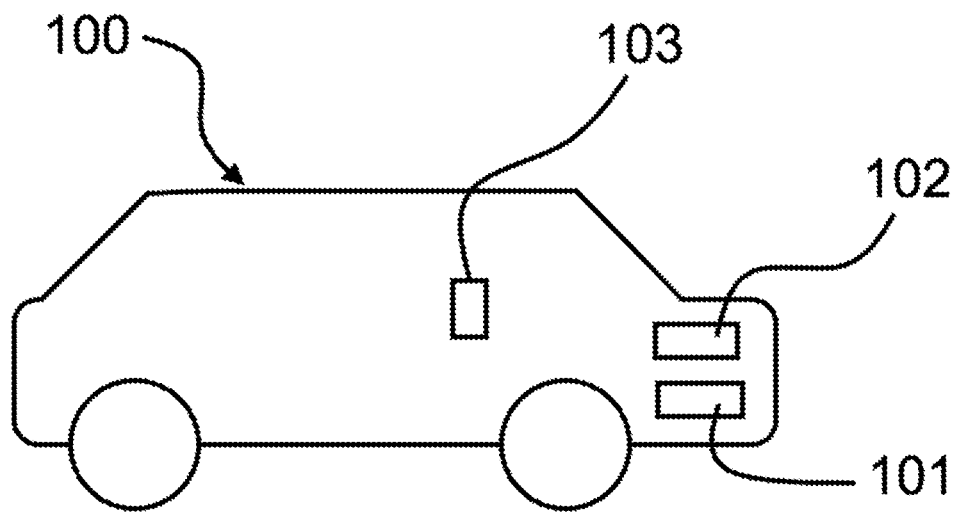
FIG. 2 shows an immobilization device integrated into a motor vehicle in which a hands-free vehicle identification device is placed.

Preferably, each operating mode associated with one of the partial unlocking states E2, E3 can be activated remotely by a remote-control device 104 (FIG. 3) using, for example, OTA ("Over The Air") connectivity technology, especially when the HFI 103 is not in the passenger compartment of vehicle 100. Each operating mode activated by the remote-control device 104 is also referred to as a "connected service." In other words, the immobilization device 101 is configured to receive a control instruction from the remote-control device 104, causing the change from the operating state that adopts the locked state E0 to one of the partial unlocking states E2, E3 with a view to implementing the associated operating mode, in particular when the HFI 103 is not present in the passenger compartment of the vehicle 100. Therefore, the control method may include a step E104 of transmitting (FIG. 1) the control instruction by means of the remote-control device 104, the control instruction requesting activation of one of the operating modes associated with one of the partial unlocking states E2, E3. This makes it possible to modify the operating state in an appropriate manner such that when the operating state has switched to state E2 or E3, the activation step 102 can activate the operating mode associated with this state E2 or E3. In particular, during transmission of the control instruction by the remote-control device 104, the remote-control device 104 is at a distance from the vehicle 100. The remote-control device 104 can therefore send as many control instructions as there are partial unlocking states to the immobilization device 101, in particular to a computer 105 (FIG. 5) thereof. A remote-control device 104 of this kind may be a smartphone provided with a suitable application. The remote-control device 104, thus forming part of a control system of the vehicle 100 comprising the immobilization device 101 (FIG. 3) and the remote-control device 104, is preferably configured to send the control instruction to the computer 105 (called the first computer 105 of the vehicle or of the immobilization device hereinafter) of the immobilization device 101 so as to ask it to activate one of the operating modes associated with one of the partial unlocking states E2, E3. This has the advantage of ensuring implementation of the desired operating mode without having to be in the vehicle 100 and without having to monitor the vehicle 100, since restricted activation thereof will ensure the security of the vehicle 100 against possible thieves. In particular, the HFI 103 is also part of the control system (FIG. 2).

According to a particular case where the aim is to activate the operating mode associated with the total unlocking state E1 of the vehicle 100, the control method may include the step E104 of transmitting (FIG. 1) the control instruction such that the transmitted control instruction requests activation of the operating mode associated with the total unlocking state E1, and the step E101 of modifying the operating state changes the operating state from the locked state E0 to the total unlocking state E1 only if the identification device 103, in particular hands-free identification device, is present in the passenger compartment of the vehicle. When the operating state has changed to the state E1, the activation step 102 can activate the operating mode associated with the state E1. This makes it possible to prevent theft of the vehicle 100 by an individual not equipped with this identification device 103.

According to a particular embodiment, there is a need to develop a solution that allows efficient implementation of the switch of the operating state from the E0 state to one of the unlocking states E1, E2, E3, and in particular in a secure manner. To meet this need, the step E101 of modifying the operating state may comprise (FIG. 1), after receipt of the control instruction in particular by the first computer 105 of the vehicle 100: a step E101-1 of transmitting an encrypted key identifying the operating mode for which activation is requested, the encrypted key being transmitted by the first computer 105 to at least one second computer 107 of the vehicle 100; a step E101-2 of the second computer 107 receiving the encrypted key, resulting in the second computer 107 switching from the locked state E0 to the unlocking state E1, E2, E3 associated with the operating mode for which activation is requested in order to authorize the second computer 107 to provide at least one service that assists with implementation of the operating mode identified by the encrypted key received. Here, the step E102 of activating the authorized operating mode makes it possible to activate the operating mode identified by the encrypted key, in particular after the encrypted key is received by the second computer 107, which uses it to switch to the corresponding unlocking state, allowing the computer to provide the service(s) that allow(s) implementation of this operating mode identified by the encrypted key. Therefore, the second computer 107 is put in the operating state that corresponds to the locked state E0 before the second computer 107 receives the encrypted key, then the second computer 107 processes the encrypted key received in order to modify the operating state by switching to the unlocking state E1, E2, E3 associated with the operating mode identified by the encrypted key received. When a plurality of second computers 107 must each provide one or more services in order to implement the operating mode identified by the encrypted key, the operating state of the vehicle, if applicable equivalent to the operating state of the immobilization device 101, switches to the unlocking state associated with the operating mode identified when each second computer 107 has received a corresponding encrypted key.

In particular, the control method comprises a step E105 (FIG. 1) of verifying a condition relating to the request to activate one of the operating modes, the verification of the condition causing implementation of the modification step E101. For example, this condition to be verified is the receipt of the control instruction, in particular by the first computer 105, which control instruction will then authorize the computer to send the encrypted key suitable for the operating mode to be activated. This makes it possible to activate the corresponding operating mode only when necessary.

According to this particular embodiment, which allows efficient implementation of the unlocking and in particular in a secure manner, the immobilization device 101 may advantageously comprise (FIG. 5) the first computer 105, the first computer 105 in particular being part of a BSI 106 of the immobilization device 101, and the at least one second computer 107. The first computer 105 then can, in particular, after verifying the condition, that is to say, for example, the receipt of the control instruction, be configured to send the encrypted key to the second computer 107, which is put in the operating state that adopts the E0 locked state. The encrypted key is sent in particular on a data bus, or a network, CAN 108. Furthermore, the second computer 107 is configured to receive the encrypted key and switch to the unlocking state E1, E2, E3 associated with the operating mode identified by the encrypted key received in order to change the operating state to the unlocking state, the unlocking state E1, E2, E3 allowing the at least one second computer 107 to provide at least one service required for the implementation of the operating mode identified by the encrypted key. Therefore, the second computer 107 is configured to use the encrypted key received in order to determine which unlocking state E1, E2, E3 must be applied as an operating state. It is possible for there to be a plurality of second computers 107 when a plurality of second computers 107 cooperate to implement the corresponding operating mode. In this case, as mentioned previously, each second computer 107 will receive an encrypted key after the control instruction has been received by the first computer 105. In the end, when all the second computers 107, which must provide one or more services in order to implement the operating mode for which activation is requested, have switched to the corresponding unlocking state E1, E2, E3, the operating state adopts the unlocking state E1, E2, E3 associated with the operating mode for which activation has been requested. Consequently, the state E0, E1, E2, E3 of the immobilization device 101 corresponds to the state of the second computer(s) 107 concerned and therefore ultimately to the operating state. Preferably, the first computer 105 is configured to send the encrypted key to the second computer 107 only if it has previously received the control instruction and a random number sent by the second computer 107, the random number being used to generate the encrypted key to be sent from the first computer 105 and to determine, in combination with the encrypted key received, the unlocking state to be applied to the second computer 107, this applying where appropriate for each of the second computers 107 that must provide services in order to implement the operating mode for which activation is requested. In particular, the second computer 107 is configured to send the random number multiple times according to a suitable time interval in order to trigger the transmission of the encrypted key shortly after receipt of the control instruction by the first computer 105. Therefore, the random number helps to improve security within the context of the modification of the operating state.

As part of the control method, the step E101-1 of transmitting the encrypted key can only be implemented after a step E106 of the first computer 105 receiving (FIG. 1) a random number sent by the at least one second computer 107. This receipt of the random number can then form part of the condition to be verified (step E105) before implementation of the modification step E101, which will then use the random number in the manner described above.

The or each second computer 107 may be chosen from the following: (1) an MEC, in which case the locked state E0 adopted by the operating state, and therefore the MEC, results in no instruction being sent by the MEC to the ignition coils (gasoline engine) and/or no instruction being sent by the MEC to the injectors (for example in the case of a gasoline engine or a diesel engine); (2) an MCU1, in which case the locked state E0 adopted by the operating state, and therefore the MCU1, results in no current/voltage control for the motor of the front electric machine by this MCU1; (3) an MCU2, in which case the locked state E0 adopted by the operating state, and therefore this MCU2, results in no current/voltage control for the motor of the rear electric machine by this MCU2; and (4) a TCU, in which case the locked state E0 adopted by the operating state, and therefore this TCU, results in it being impossible to leave the parking function of the automatic gearbox.

Therefore, the restricted activation of the vehicle 100 authorized when the operating state changes from the locked state E0 to one of the partial unlocking states E2, E3 may comprise changing the operating state of one or more second computers 107 of the vehicle 100 from the locked state to the relevant partial unlocking state such that the second computers 107 provide one or more restricted services depending on the relevant unlocking state.

A particular example of the operation of the immobilization device 101 is described below for which the second computer 107 is the MEC and the first computer 105 is the computer for the BSI. Firstly, a random number "SEED" (FIGS. 6 to 8), also referred to as "random seed," generated by the MEC 107 is sent via the CAN 108 to the computer 105 of the BSI. Depending on the situation of the vehicle 100, that is to say: authentication of an HFI by the BSI and request to start the vehicle 100 (Situation_1 visible in FIG. 6), or request for activation of the "thermal preconditioning" connected service by the remote-control device 104 (Situation_2 visible in FIG. 7), or request for activation of the "autonomous parking" connected service by the remote-control device 104 (Situation_3 visible in FIG. 8), or request for activation of another connected service by the remote-control device 104, the computer 105 of the BSI will respond to the MEC 107, in particular after having received the random number sent by the MEC 107, with an encrypted key corresponding to this situation and generated using this random number. For example, the computer 105 of the BSI responds to the MEC 107 via the CAN network 108 with an encrypted key "KEY_1" in the case of authentication of the HFI (present in the passenger compartment of the vehicle 100) by the BSI (FIG. 6) and a request to start the vehicle 100, with an encrypted key "KEY_2" in the case of the request for activation of the "thermal preconditioning" connected service (FIG. 7), with an encrypted key "KEY_3" in the case of the request for activation of the "autonomous parking" connected service (FIG. 8), or with other encrypted keys in the case of a request for activation of other connected services by the remote-control device 104 and which each require restricted activation of the vehicle 100. For example, if the MEC receives "KEY_1" (FIG. 6), the MEC processes this key "KEY_1" in particular using the random number in order to ensure the security of the exchange between the computer of the BSI and the MEC, the processing of the key "KEY_1" resulting in the MEC becoming completely unlocked (transition to the unlocking state E1) and performing its functions normally without any restrictions (in particular the control of the ignition coils and/or the sending of the instructions to the injectors), thus allowing implementation of the first operating mode M1. For example, if the MEC receives "KEY_2" (FIG. 7), the MEC processes the key "KEY_2" in particular using the random number in order to ensure the security of the exchange between the computer of the BSI and the MEC, the processing of the key "KEY_2" resulting in the MEC becoming partially unlocked (transition to the partial unlocking state E2) and performing its functions in a restricted manner, thus allowing implementation of the second operating mode M2. The list of restrictions that become effective when the partial unlocking associated with "KEY_2" is activated depends on the function, however it is assumed that it is only possible to control the ignition coils and/or send instructions to the injectors if the speed of the vehicle 100 is zero. Indeed, it should only be possible to execute the "thermal preconditioning" operating mode when the vehicle 100 is stationary. For example, if the MEC receives "KEY_3" (FIG. 8), the MEC processes this key "KEY_3" in particular using the random number in order to ensure the security of the exchange between the computer of the BSI and the MEC, the processing of the key "KEY_3" resulting in the MEC becoming partially unlocked (transition to state E3) and performing its functions in a restricted manner, thus allowing implementation of the third operating mode M3. The list of restrictions that become effective when the partial unlocking associated with "KEY_3" is activated depends on the function, however it is assumed that the control of the ignition coils and/or the sending of the instructions to the injectors does not allow the vehicle 100 to cross a speed threshold (for example a threshold of 30 km/h). Indeed, it should only be possible to execute the "autonomous parking" operating mode when the vehicle 100 is traveling at low speed. For example, if the MEC receives another encrypted key, the MEC can become partially unlocked and provide its service(s) related to the connected service associated with this key in a restricted manner. The list of restrictions that become effective when the partial unlocking is activated is to be defined according to the connected service associated with this partial unlocking.

In general, it should be understood that a role of the first computer 105 is to receive the control instruction in order to then allow modification of the operating state.

As a note, according to the specific example above and in particular in a manner applicable to all the embodiments, there are as many partial unlocking states as there are connected services which are supported by the vehicle 100 and which are activated via the remote-control device 104. These connected services that the vehicle 100 must provide require restricted activation of the vehicle 100, in particular if no HFI is identified by the BSI and no service/operating mode associated with an unlocking state is active. If the BSI does not respond to the MEC, the MEC remains in the operating state corresponding to the locked state E0, which results in no instruction being sent to the ignition coils and/or no instruction being sent to the injectors. By virtue of the management of the partial unlocking states described, OTA technology can be used to allow the vehicle 100 to be partially unlocked while preserving the level of security of the control method or of the immobilization device 101 and therefore to prevent theft of the vehicle. Although the specific example has been described in connection with the MEC, this operation can also be applied to the MCU1, MCU2, or TCU.

An advantage of the specific example given above is that it can be implemented by impacting the software embedded in the first and second computers already present in the vehicle. There is therefore no need to modify in depth the architecture of existing vehicles in order to implement this method. Therefore, in general, the implementation of the method does not impose significant additional costs.

Thus, it should be understood that the method makes it possible to authorize restricted activation of the vehicle during execution of connected services. To do this, the additional states (in addition to the conventional locked/total unlocking states), corresponding to the partial unlocking states, are produced by the immobilization device 101. The computer(s) (MEC, TCU, or MCUx) are then authorized to provide restricted services according to the active selected partial unlocking state. Each of these new partial unlocking states corresponds to a type of connected service, or operating mode, to be provided by the vehicle 100, preferably when a control instruction transmitted by the remote-control device 104 is received by the vehicle 100, the connected service requiring restricted activation of the vehicle.

Figure 3:
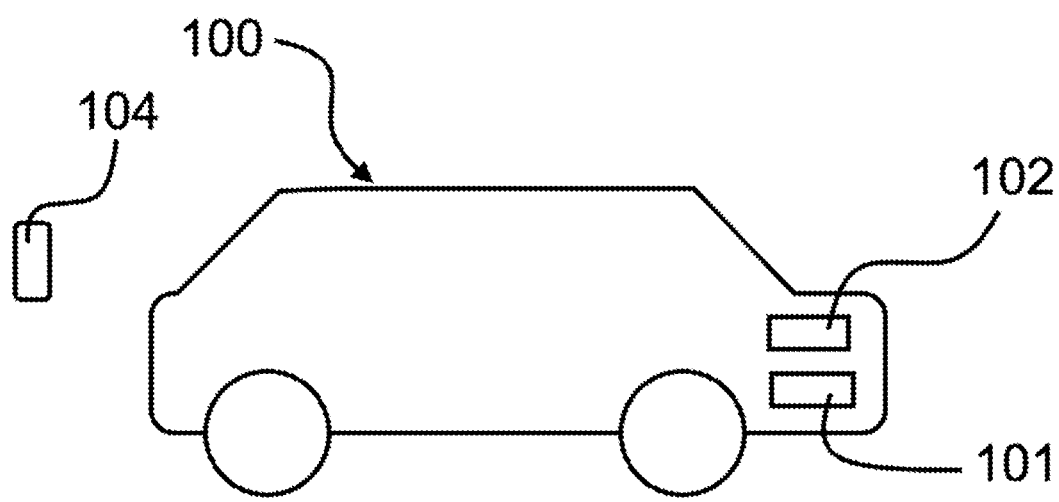
FIG. 3 shows the immobilization device integrated into the motor vehicle and associated with a remote-control device.
Figure 4:
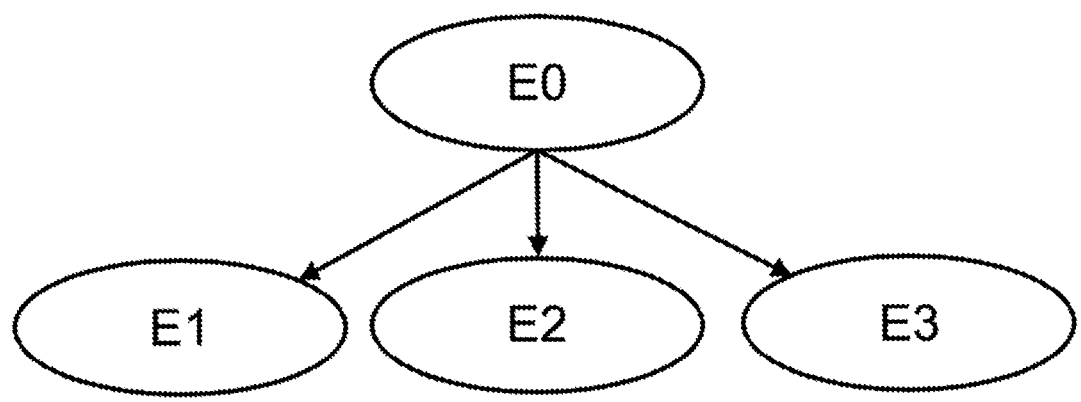
FIG. 4 shows different states that the operating state can assume from a locked state.

Of course, it should also be understood that the present method applies to a vehicle 100, in particular a motor vehicle, comprising the immobilization device 101 as described (FIGS. 2 and 3). The advantages of a vehicle 100 of this kind result from those described above in connection with the control method and the immobilization device 101.

Everything that applies to the control method can be applied to the immobilization device 101 and vice versa.

One industrial application of the present method is in the field of vehicles, in particular motor vehicles, in that, according to the method, the immobilization device 101 can be integrated in the vehicle 100.

The invention claimed is:

1. A method for controlling an operating state of a vehicle having a first computer and at least one second computer, wherein the control method changes the operating state from a locked state which immobilizes the vehicle, to an unlocked state, the unlocked state being selected from any of the following unlocked states:
a total unlocking state which allows activation of an operating mode of the vehicle without any restrictions,
at least two partial unlocking states which each allow the activation of an operating mode associated with the partial unlocking state and which allow restricted activation of the vehicle,
and wherein the control method comprises:
receiving at said first computer a control instruction from a remote control device, said control instruction requesting activation of a selected one of the operating modes associated with selected partial unlocking state,
modifying the operating state so as to change it from the locked state to the selected unlocking state associated with the operating mode for which activation is requested in order to authorize activation of said operating mode, and
activating the authorized operating mode,
and in that the step of modifying the operating state comprises, after receipt of the control instruction:
said at least one second computer sending to said first computer a random number, the at least one second computer sending the random number multiple times:
said first computer generating an encrypted key using said random number, said encrypted key identifying the operating mode for which activation is requested, and said first computer transmitting said encrypted key to said at least one second computer of the vehicle, and
a step of said at least one second computer receiving the encrypted key, and the at least one second computer switching the operating mode from the locked state to the selected unlocking state associated with the operating mode for which activation is requested in order to authorize said at least one second computer to provide at least one service that assists with implementation of the operating mode identified by the encrypted key received.

2. The control method according to claim 1, wherein the method comprises a step of verifying a condition relating to the request for activating one of the operating modes, the verification of the condition causing the modification step to be implemented.

3. The control method according to claim 1, wherein one of the operating modes associated with one of the partial unlocking states provides, when this operating mode is activated, an autonomous parking function of the vehicle such that the restricted activation of the vehicle allows movement of the vehicle while preventing the vehicle from crossing a speed threshold.

4. The control method according to claim 1, wherein one of the operating modes associated with one of the partial unlocking states provides, when this operating mode is activated, a thermal preconditioning function of the vehicle such that the restricted activation of the vehicle allows said thermal preconditioning function to be implemented provided that the speed of movement of the vehicle is zero.

5. The control method according to claim 1, wherein the method comprises a step of transmitting the control instruction such that the control instruction transmitted requests activation of the operating mode associated with the total unlocking state, and the step of modifying the operating state changes the operating state from the locked state to the total unlocking state only if an identification device is present in the passenger compartment of the vehicle.

6. The control method according to claim 1, wherein each instance of restricted activation of the vehicle involves activating all or part of a power train of the vehicle intended to set said vehicle in motion while limiting the operation of said power train.

7. An immobilization device for a vehicle comprising means for carrying out the steps of the control method according to claim 1.

8. A vehicle comprising the immobilization device according to claim 7.

9. The immobilization device according to claim 7, wherein said immobilization device includes said first computer and said at least one second computer.

10. The control method according to claim 1, wherein, said at least one second computer processes the encrypted key received from the first computer using the random number to ensure the security of the transmission of the encrypted key received form the first computer.

11. The control method of claim 1 wherein the first computer is part of a built-in systems interface of the vehicle.

12. A method for changing the operating state of a vehicle from a locked state in which the vehicle is immobilized to a selected unlocked state; said selected unlocked state being selected from a fully unlocked state in which the vehicle is fully operational or one of a plurality of partially unlocked states in which the functionality of selected systems is limited or not activated; said method comprising:

a first computer of said vehicle receiving a request from a remote device to place the vehicle in said selected unlocked state;

said first computer receiving from a second computer of said vehicle a random number and verifying said request, said random number being received from said second computer multiple times;

said first computer generating an encrypted key using said random number; said encrypted key identifying the requested operating mode;

said first computer sending said encrypted key to said second computer;

said second computer processing the encrypted key using said random number;

said second computer authorizing and activating said requested operating mode.

13. The method of claim 12 wherein said remote device is a hands free device or a remote control device.

14. The method of claim 12 wherein said step of transmitting said random number comprises sending said random number by a serial system bus of said vehicle.

* * * * *